United States Patent
Lorenz et al.

(10) Patent No.: US 10,583,911 B2
(45) Date of Patent: Mar. 10, 2020

(54) FOLDABLE WING AND ACTUATOR ARRANGEMENT

(71) Applicants: Airbus Operations GmbH, Hamburg (DE); Airbus Operations Limited, Bristol (GB)

(72) Inventors: Christian Lorenz, Hamburg (DE); Benjamin Bishop, Bristol (GB)

(73) Assignees: Airbus Operations GmbH, Hamburg (DE); Airbus Operations Limited, Bristol (GB)

( * ) Notice: Subject to any disclaimer, the term of this patent is extended or adjusted under 35 U.S.C. 154(b) by 341 days.

(21) Appl. No.: 15/619,366

(22) Filed: Jun. 9, 2017

(65) Prior Publication Data

US 2017/0355444 A1   Dec. 14, 2017

(30) Foreign Application Priority Data

Jun. 9, 2016 (EP) .................................. 16173834

(51) Int. Cl.
*B64C 3/56* (2006.01)
*B64C 23/06* (2006.01)

(52) U.S. Cl.
CPC .............. *B64C 3/56* (2013.01); *B64C 23/072* (2017.05); *Y02T 50/14* (2013.01); *Y02T 50/164* (2013.01)

(58) Field of Classification Search
CPC ......... B64C 3/56; B64C 23/072; Y02T 50/14; Y02T 50/164
See application file for complete search history.

(56) References Cited

U.S. PATENT DOCUMENTS

| 4,132,090 A | 1/1979 | McDermott |
| 5,201,479 A | 4/1993 | Renzelmann |
| 2010/0264260 A1* | 10/2010 | Hammerquist ........... B64C 3/56 244/49 |
| 2010/0314189 A1 | 12/2010 | Smith et al. |
| 2012/0228424 A1 | 9/2012 | Parker |
| 2013/0341467 A1* | 12/2013 | Sakurai ..................... B64C 3/56 244/201 |
| 2015/0097087 A1* | 4/2015 | Sakurai ..................... B64C 9/00 244/201 |
| 2017/0152889 A1* | 6/2017 | Tyler ........................ F16C 33/04 |
| 2017/0355437 A1* | 12/2017 | Bishop ....................... B64C 3/56 |
| 2017/0355438 A1* | 12/2017 | Bishop ....................... B64C 3/56 |
| 2017/0355440 A1* | 12/2017 | Bishop ....................... B64C 3/56 |

(Continued)

FOREIGN PATENT DOCUMENTS

| EP | 2 676 878 | 12/2013 |
| EP | 2 727 827 | 5/2014 |

OTHER PUBLICATIONS

Extended EP Search Report for EP16173834, dated Nov. 17, 2016, 5 pages.

*Primary Examiner* — Rodney A Bonnette

(74) *Attorney, Agent, or Firm* — Nixon & Vanderhye P.C.

(57) ABSTRACT

A wing arrangement for an aircraft is described including a wing (5) having a base section (5) and a tip section (13), the base section (7) having a first end portion (9) and a second end portion (11), the tip section (13) having a third end portion (15) and a fourth end portion (17), wherein the second end portion (11) and the third end portion (15) are coupled with each other by a coupling arrangement so that the tip section (13) is pivotable with respect to the base section (7) about a pivot axis (19, 19').

15 Claims, 8 Drawing Sheets

(56) References Cited

U.S. PATENT DOCUMENTS

2017/0355442 A1\* 12/2017 Winkelmann ............ B64C 3/56
2017/0355443 A1\* 12/2017 Winkelmann ............ B64C 3/56
2018/0057144 A1\* 3/2018 Lorenz ..................... B64C 3/56
2018/0222569 A1\* 8/2018 Brakes ..................... B64C 3/56

\* cited by examiner

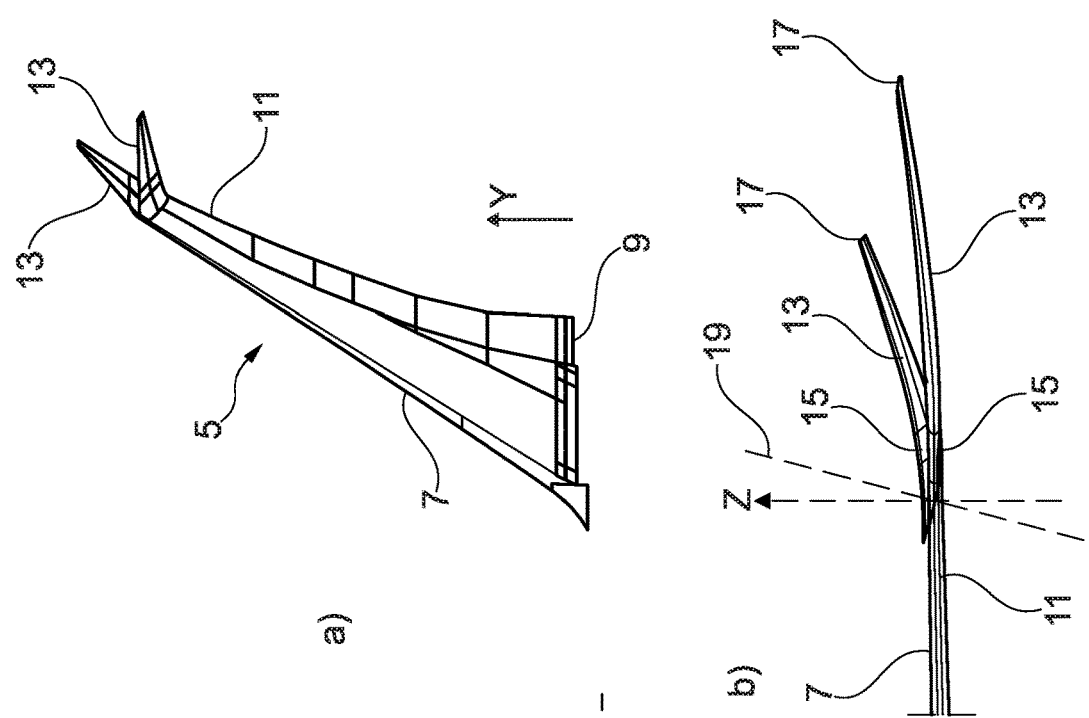
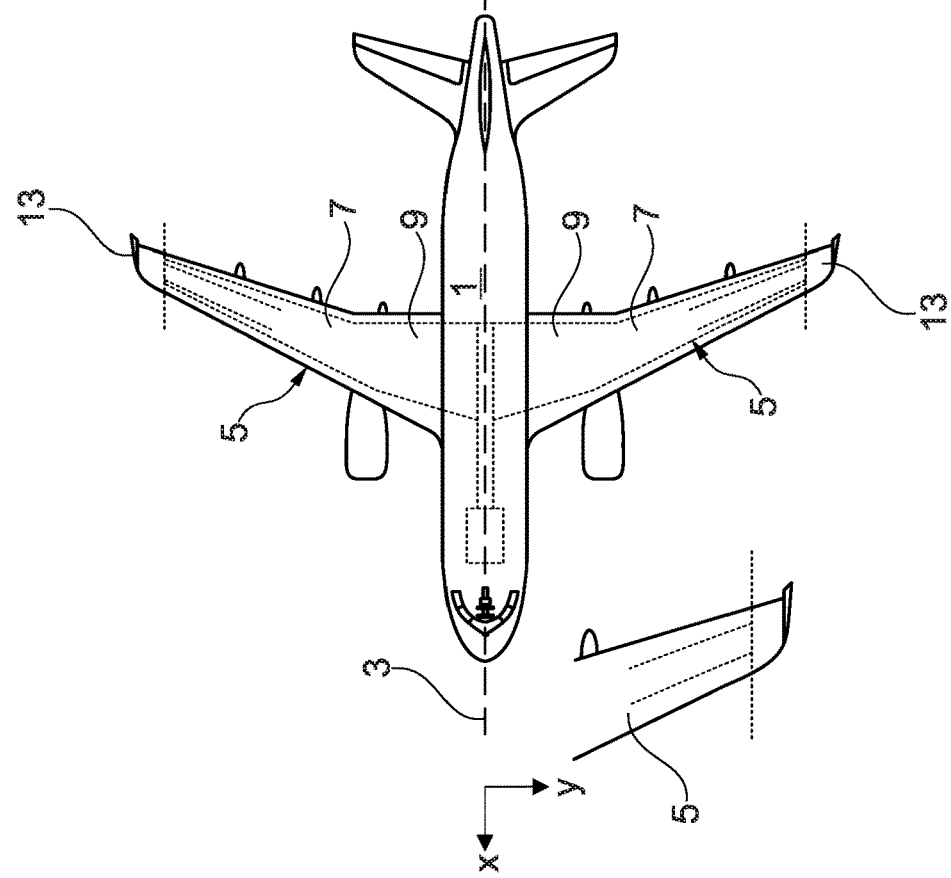

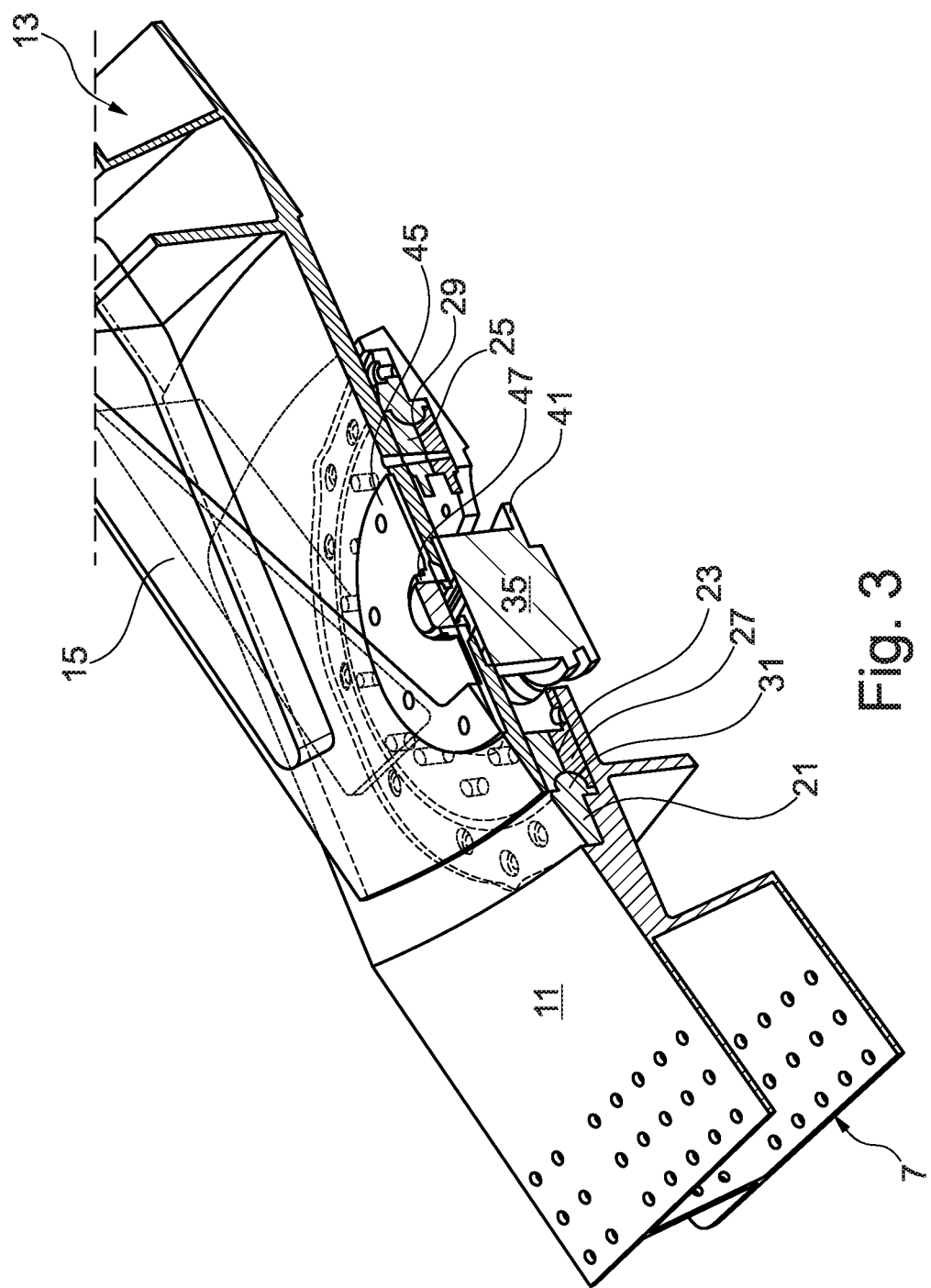

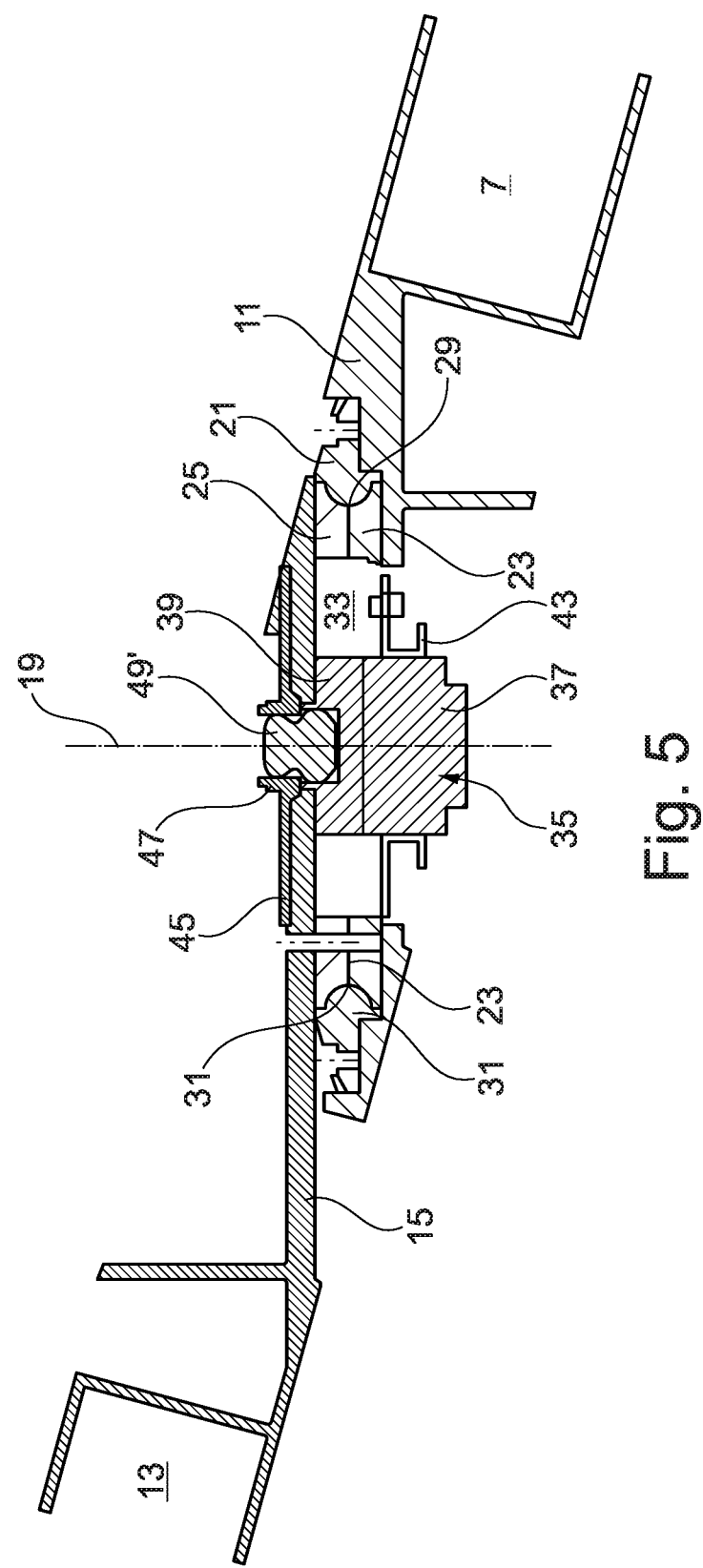

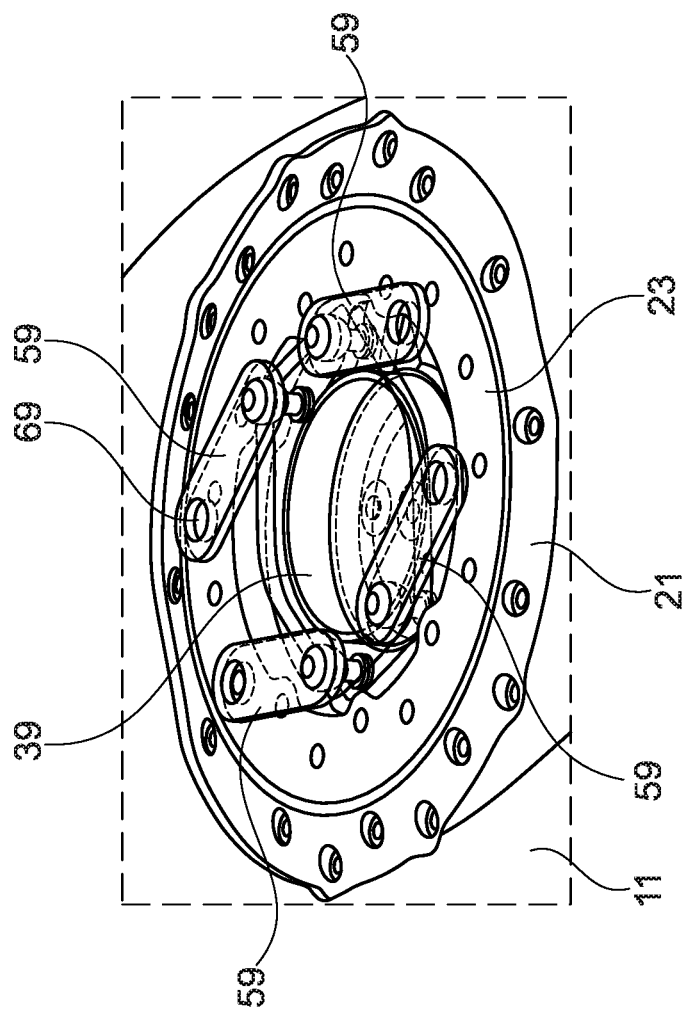
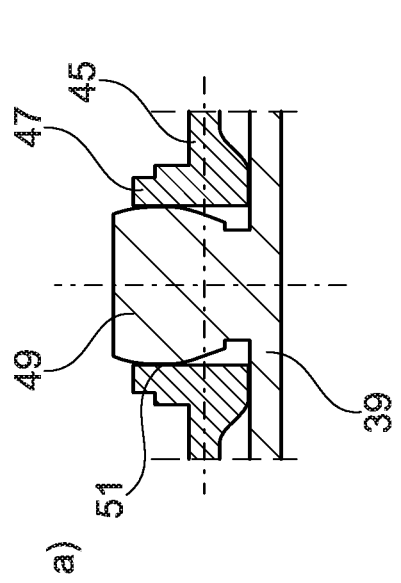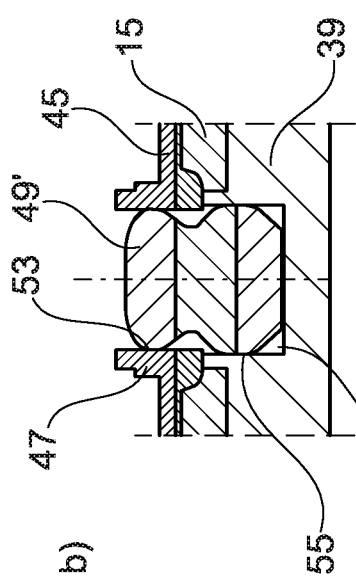

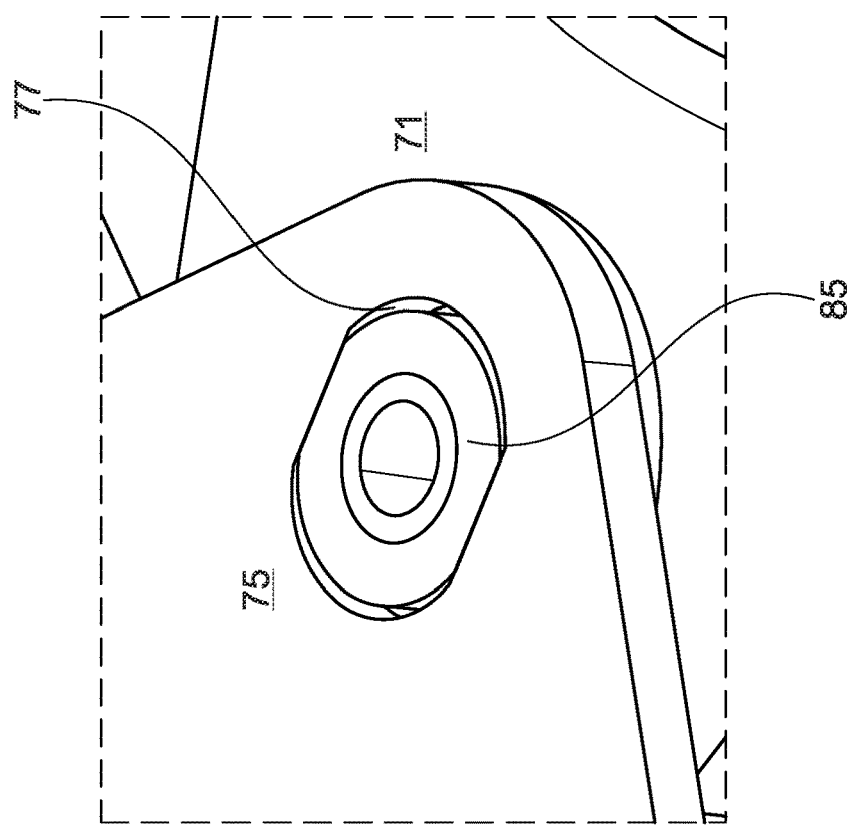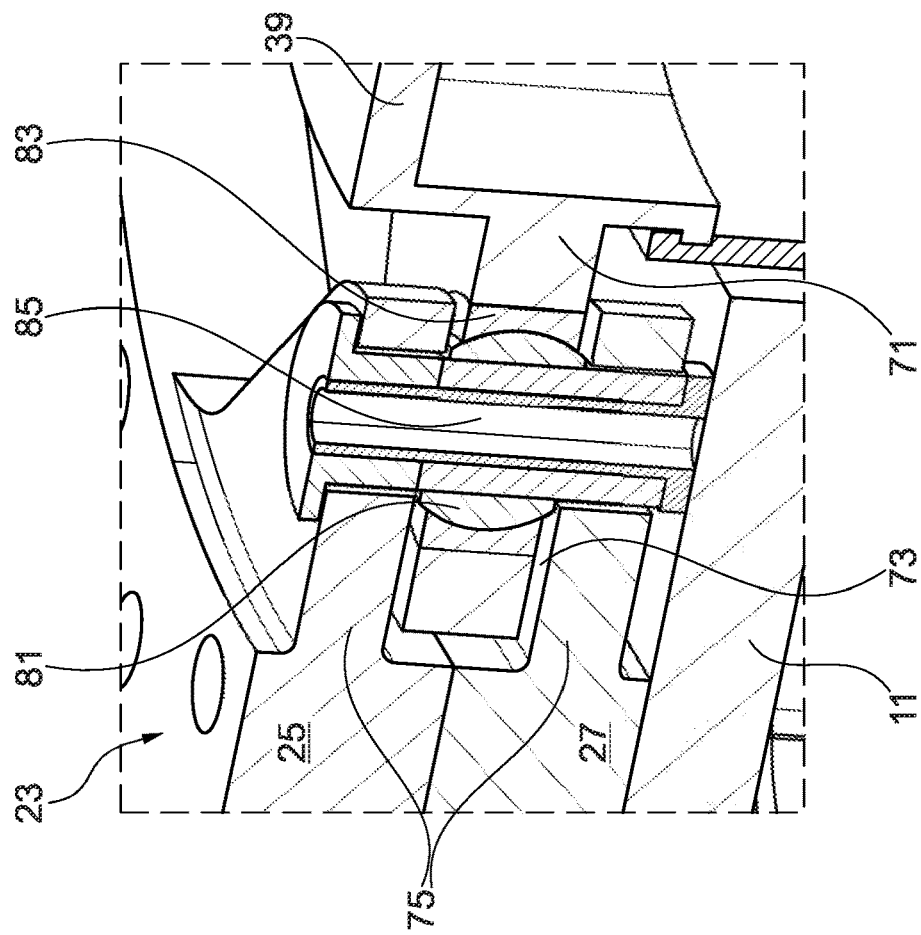

FOLDABLE WING AND ACTUATOR ARRANGEMENT

RELATED APPLICATION

This application claims priority to and incorporates by reference European Patent Application 16173834.9 filed on Jun. 9, 2016.

BACKGROUND AND SUMMARY OF THE INVENTION

The present invention relates to a wing arrangement for an aircraft comprising a wing having a base section and a tip section, the base section having a first end portion and a second end portion, the tip section having a third end portion and a fourth end portion, wherein the first end portion is adapted to be coupled to the fuselage of the aircraft and wherein the second end portion and the third end portion are coupled with each other so that the tip section is pivotable with respect to the base section about a pivot axis.

The aspect ratio, i.e. the ratio of span to chord, of an aircraft wing is one factor influencing the efficiency of the aircraft during flight. Generally, an increase of the aspect ratio is associated with an increased efficiency during steady flight. Therefore, an increase of the wingspan of an aircraft is one factor to take into consideration when seeking to reduce fuel consumption. However, when elongating the wing of an existing family of aircraft, it may become necessary to adapt the aircraft family specific infrastructure, and airport fees may increase.

One possibility to increase the wingspan without having to adapt the aircraft family specific infrastructure and having to deal with increased airport fees, or to reduce airport fees for existing aircraft is to provide for a foldable wing construction which allows to pivotably move an outboard end portion of the wing between a deployed position, in which the wing has its normal flight configuration, and a stowed position, in which the wing has a folded configuration and the wingspan is decreased as compared to the deployed position.

A wing arrangement is disclosed having a foldable wing which is safe and reliable in operation and has at the same time of a simple construction.

Hence, a wing arrangement is disclosed including a wing having a base section and a tip section, the base section having a first end portion and a second end portion, the tip section having a third end portion and a fourth end portion, wherein the first end portion is adapted to be coupled to the fuselage of the aircraft. The second end portion and the third end portion are coupled with each other by a coupling arrangement so that the tip section is pivotable with respect to the base section about a pivot axis. In particular, a pivotal movement of the tip section relative to the base section between a stowed position and a deployed position is enabled, wherein the spanwise length of the wing is larger in the deployed position than in the stowed position. In other words, the length of the entire wing measured parallel to the y-axis of the aircraft to which the wing arrangement is coupled, is larger in the deployed position than in the stowed position.

Thus, the wing arrangement is formed of two sections, namely the base section intended to be secured to the fuselage of the aircraft and the tip section pivotably connected to the distal end of the base section. Further, in a preferred embodiment the pivot axis may extend nearly parallel to the z-axis of the aircraft on which the wing arrangement of the present invention is mounted. In particular, it can be tilted by 15° with respect to the vertical direction or z-axis so that when the tip section pivots rearwards or forwards from the deployed position in which the tip section is aligned with the longitudinal axis of the base section, to the stowed position, the distal end of the tip section moves upwards.

The coupling arrangement comprises an annular outer part and an annular inner part, and one of the annular outer part and the annular inner part is fixedly coupled to the second end portion whereas the other of the annular outer part and the annular inner part is fixedly coupled to the third end portion. In particular, it is preferred that the annular outer part is fixedly coupled to the second end portion and the annular inner part is fixedly coupled the third end portion.

The annular outer part extends in a plane perpendicular to the pivot axis and at least partially surrounds a receiving space, wherein the annular inner part is at least partially received in the receiving space and the annular inner part at least partially surrounds an actuator space. Further, the annular outer part and the annular inner part are configured such that the annular inner part is guided by the annular outer part inside the receiving space for the pivot movement about the pivot axis between the deployed and stowed positions. Thus, the annular inner and outer parts form a bearing arrangement, which guides the pivotal movement of the tip section relative to the base section. Further, a free space is provided inside the annular inner part in the center of the bearing arrangement, and this free space extends along the pivot axis about which the tip section pivots.

The coupling arrangement further comprises an actuator received in this free space or actuator space, and the actuator comprises a base member and an output member which is pivotably mounted on the base member. The base member is fixedly coupled to the second end portion, and hence the base section, whereas the output member is fixedly coupled to the third end portion, i.e. the tip section. So, the output member may pivot with respect to the base member about the pivot axis, and the actuator comprises drive means coupled to the base member and the output member and being adapted such that when the drive means are actuated a pivotal movement of the output member relative to the base member about the pivot axis is effected.

Here, it has to be noted, that when two elements are described as being fixedly coupled, this includes both a direct connection without any intermediate elements and an indirect connection with intermediate elements between the elements being coupled. However, in any case the spatial relationship between those elements described as being fixedly coupled cannot change.

Thus, in the configuration of the present invention the actuator which effects the pivotal movement of the tip section relative to the base section is arranged in the center of the bearing arrangement for pivotably supporting the tip section on the base section of the wing. This allows to couple the base member and the driven output member of the actuator with the second end portion and the third end portion in a way in which the distance these connections have to the pivot axis, can be minimized. However, those sections of the second and the third end portions being in the load path between the annular inner and outer parts and the connection to the actuator are subject to loads during the pivotal movement and have to be designed such that these loads can be borne by the respective sections. Since in the configuration of the present invention these load paths can be kept short, only small parts of both the second and the third end portions have to be designed with a high structural stability which leads to weight savings.

A further advantage is that the actuator and the respective coupling assembly do not extend over a big area but are arranged in the vicinity of the bearing arrangement which facilitates maintenance of the actuator.

In a preferred embodiment, the annular outer part is formed as an outer ring member being circular or having the shape of a segment of a circle and having an inner support surface, and the annular inner part is formed as an inner ring member being circular or having the shape of a segment of a circle and having an outer support surface. The inner support surface at least partially abuts on the outer support surface. Such an arrangement results in small dimensions of the combination of the annular outer and inner parts in the direction of pivot axis which is particularly advantageous when the pivot axis extends nearly parallel to the z-axis of the respective aircraft.

In order to increase stability of the bearing arrangement formed by the ring members, one of the inner support surface and the outer support surface comprises at least one protrusion extending radially with respect to the pivot axis and the other of the inner support surface and the outer support surface comprises an annular recess extending radially with respect to the pivot axis. The at least one protrusion and the recess are configured such that the protrusion extends into the recess.

In a further preferred embodiment a first coupling member is provided which extends over the actuator space, wherein the coupling member is fixedly coupled to the third end portion and comprises a first engagement member being accessible from the actuator space. The output member comprises a second engagement member, being in engagement with the first engagement member, wherein the first and the second engagement members are configured such that when being in engagement with each other torque supplied by the output member is transferred to the coupling member and that the second engagement member can be disengaged from the first engagement member by a linear movement of the actuator along the pivot axis.

Firstly, such an arrangement allows to minimize the length of the load path in the third end portion, as the connection between the coupling member and the output member is positioned inside the annular inner part when seen along the pivot axis so that load path can extend only between the pivot axis and annular inner part. Further, maintenance and especially replacement of the actuator are facilitated, as it is merely required to withdraw the output member along the pivot axis to decouple it from the third end portion.

Here, it is particularly preferred when the base member and the output member are dimensioned such that the base member and the output member can be moved at least partially into the actuator space by a linear movement along the pivot axis and when the base member comprises at least one fixing element fixedly coupled to the base member and extending radially outwardly therefrom. The fixing element is designed such that when the first and second engagement members are in engagement with each other, the at least one fixing element abuts on an abutment surface formed on an abutment element fixedly coupled with the second end portion, the abutment surface extending transversely to the pivot axis. Such a configuration allows for a particularly simple replacement of the actuator, as it has simply to be moved out of and into the actuator space by a movement along the pivot axis. Access to the actuator is provided on that side of the bearing assembly opposite to the coupling member.

In a further preferred embodiment the first engagement member is one of a sleeve having an internal spline and a pin having an outer spline, and the second engagement member is the other of a sleeve having an internal spline and a pin having an outer spline, wherein the pin extends into the sleeve so that the internal spline meshingly engages with outer spline. Such a splined connection can be disengaged by an axial movement and allows to transmit the required torque.

Preferably, the outer spline on the pin can be formed as a curved spline such that the radial part of the outer cross section of the curved spline taken along the longitudinal axis of the pin is curved. In particular, the curved spline may be formed as a so-called crowned spline in which the root line of the spline is a radius. Further, it is also conceivable that the curved spline is a double tapered spline so that the root line of the curved spline is a shallow inverted "V". However, other configurations of a curved spline can also be employed. The advantage of using a curved spline is that a splined coupling one member of which being a curved spline is capable to accept a certain mismatch between the pivot axis defined by the annular parts forming the bearing arrangement and the axis of the actuator. Such mismatch may be due to structure and installation tolerances.

This capability can be further improved with a configuration in which the first engagement member is formed as a sleeve having a first internal spline and the second engagement member is formed as a pin having a first outer curved spline such that the radial part of the outer cross section of the first outer curved spline taken along the longitudinal axis of the pin is curved, wherein the first outer curved spline meshingly engages with the first internal spline. Further, the base member comprises a receiving opening the internal wall of which being provided with a second internal spline, and the pin comprises a second outer curved spline which meshingly engages with the second internal spline, wherein the radial part of the outer cross section of the second outer curved spline taken along the longitudinal axis of the pin is curved. Hence, the pin is not rigidly connected to the output member of the actuator, but a splined connection with a further curved spline is employed.

In an alternative preferred embodiment at least two arm members are pivotably coupled to the output member so that each arm member may pivot relative to the output member about an axis which is parallel to the pivot axis, and each arm member is also pivotably coupled to the third end portion so that each arm member may pivot relative to the third end portion about an axis which is parallel to the pivot axis.

Here, to keep the load path as short as possible, it is particularly preferred, when the annular outer part is fixedly coupled to the second end portion of the base member and the annular inner part is fixedly coupled to the third end portion of the tip section wherein each arm member is directly pivotably coupled to the annular inner part.

For each arm member the pivotable coupling to the output member is spaced from the pivotable coupling to the third end portion when seen in a plane perpendicular to the pivot axis. In other words, for each arm member the projection of the coupling between the arm member and the output member onto a plane perpendicular to the pivot axis is spaced from the projection of the coupling between the arm member and the third end portion, so that the axes of the pivotable connections or one arm member do not coincide.

Such an arrangement is also capable to accept a mismatch or misalignment of the pivot axis defined by the bearing arrangement formed of the annular inner and outer parts on the one hand and the axis about which the base member and the output member of the actuator pivot on the other.

In order to be capable to account for a mismatch along the pivot axis it is further preferred, when each arm member is pivotably coupled to the output member by a ball member which extends into a first hole formed in the arm member and into a second hole formed in the output member.

In a further preferred embodiment the annular inner part is fixedly coupled to the third end portion whereas the annular outer part is fixedly coupled to the second end portion. The output member of the actuator comprises lug members extending radially outwards from the output member and the annular inner part comprises link members extending radially inwards wherein each of the lug members is pivotably coupled with one of the link members such that the lug member may pivot with respect to the link member about an axis that is parallel to the pivot axis. Hence, in such an arrangement the coupling assembly between the output member and the annular inner part coupled to the tip portion is in the actuator space so that the dimensions in the direction of the pivot axis of the entire coupling arrangement are kept small.

Here, it is further preferred when one of the lug members and the link members are formed such that each of the members comprises a radially extending slot open towards the other of the lug members and the link members so that each of the other of lug members and the link members extend into a slot. Further, each of the lug members is coupled to one link member by a bolt extending through aligned holes in the lug member and the link member, wherein a ball member is arranged in the hole of each of the other of the lug members and the link members, the ball member having an outer diameter corresponding to the diameter of the hole in which it is arranged and wherein each bolt extends through a through hole in the ball member. Such an arrangement also allows for a mismatch between the pivot axis defined by the annular inner and outer parts and the axis about which the output member pivots, since the connection between the lug members and the link members via a ball member is not rigid.

Finally, the above object is also achieved by an aircraft comprising a fuselage and at least one of the above-described wing arrangements.

SUMMARY OF THE DRAWINGS

In the following preferred embodiments of the present invention will be described with reference to the accompanied drawings. In the drawings FIG. 1 is a schematic top view of an aircraft to which a first embodiment of a wing arrangement according to the present invention is secured, FIG. 2 is a top view (Part a)) and a front view (Part b)) of a wing of the embodiment of FIG. 1, FIG. 3 is a partial perspective sectional view of the coupling arrangement of the embodiment of FIG. 1, FIG. 5 is a cross sectional view of the coupling arrangement of second embodiment, FIG. 6 shows a detail of FIG. 4 (Part a)) and a detail of FIG. 5 (Part b)), FIG. 7 is a perspective partial view of the coupling arrangement of a third embodiment, FIG. 12 is a partial cross sectional view showing a detail of FIG. 11 and FIG. 13 is a perspective view showing a further detail of FIG. 11.

DETAILED DESCRIPTION OF THE INVENTION

Figure 4:
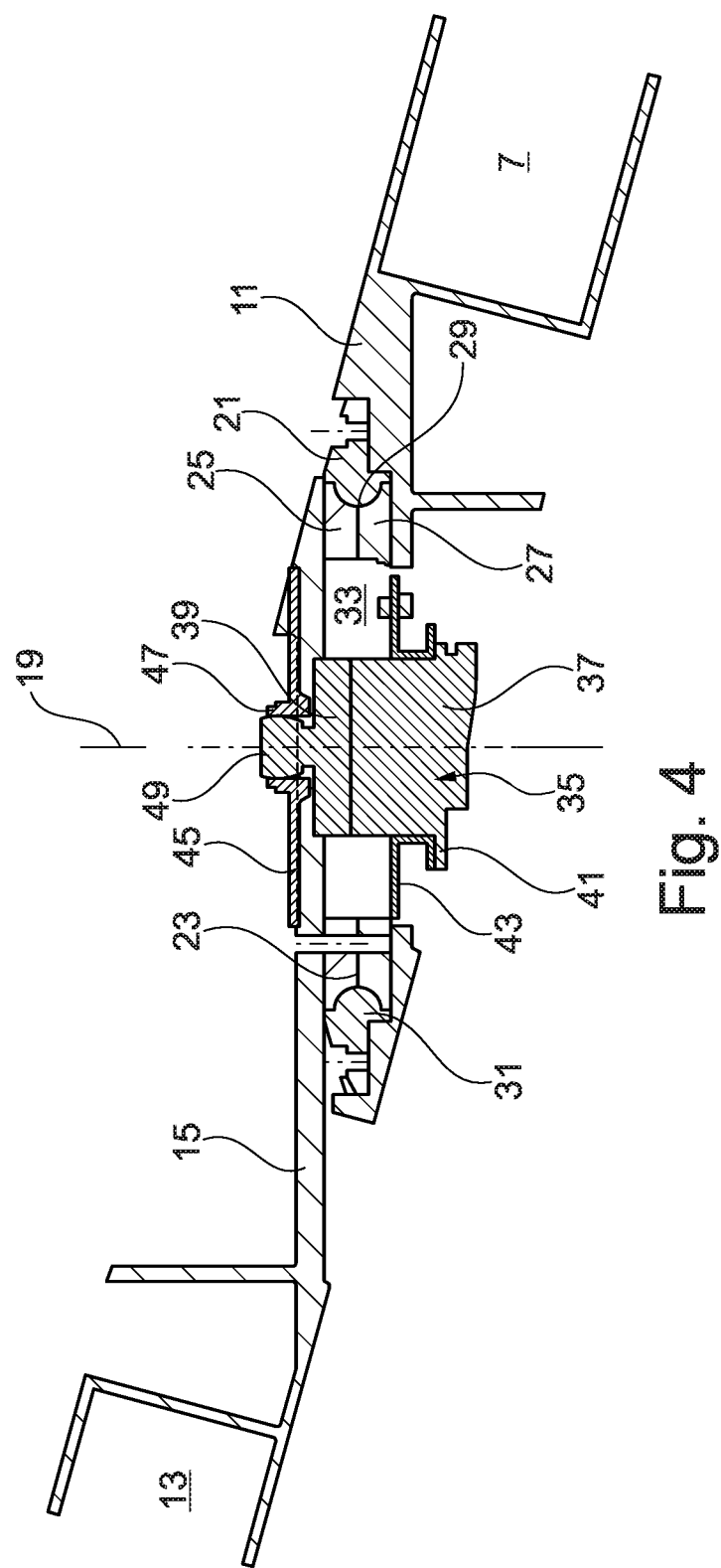
FIG. 4 is a cross sectional view of the coupling arrangement of the embodiment of FIG. 1.
Figure 9:
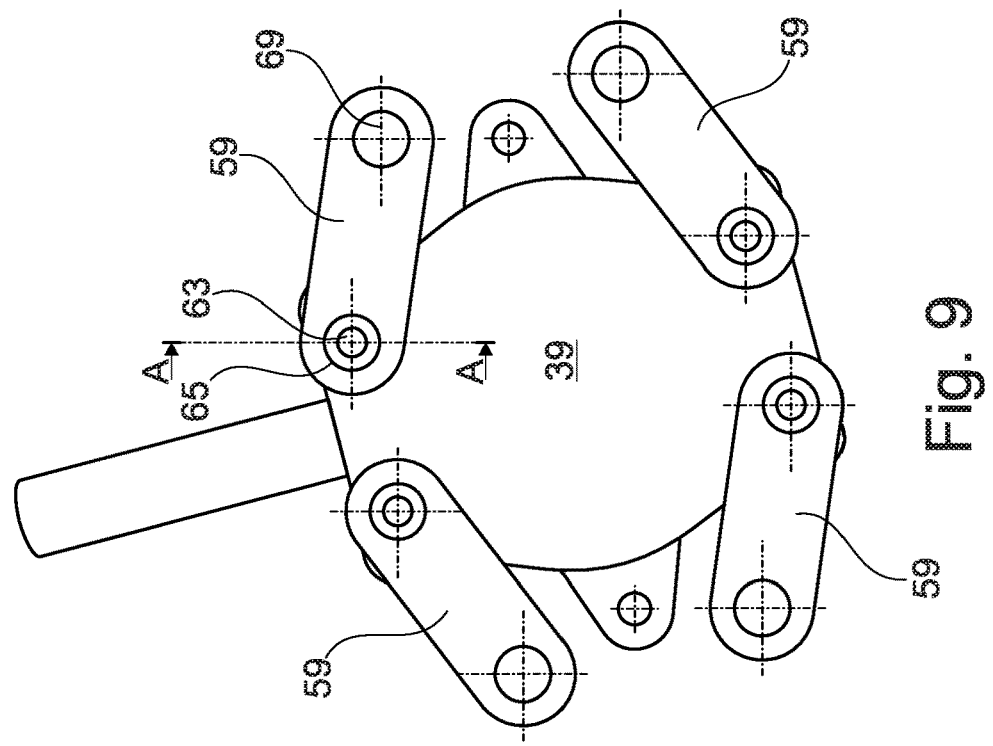
FIG. 9 is partial top view of the coupling arrangement of FIG. 7.
Figure 8:
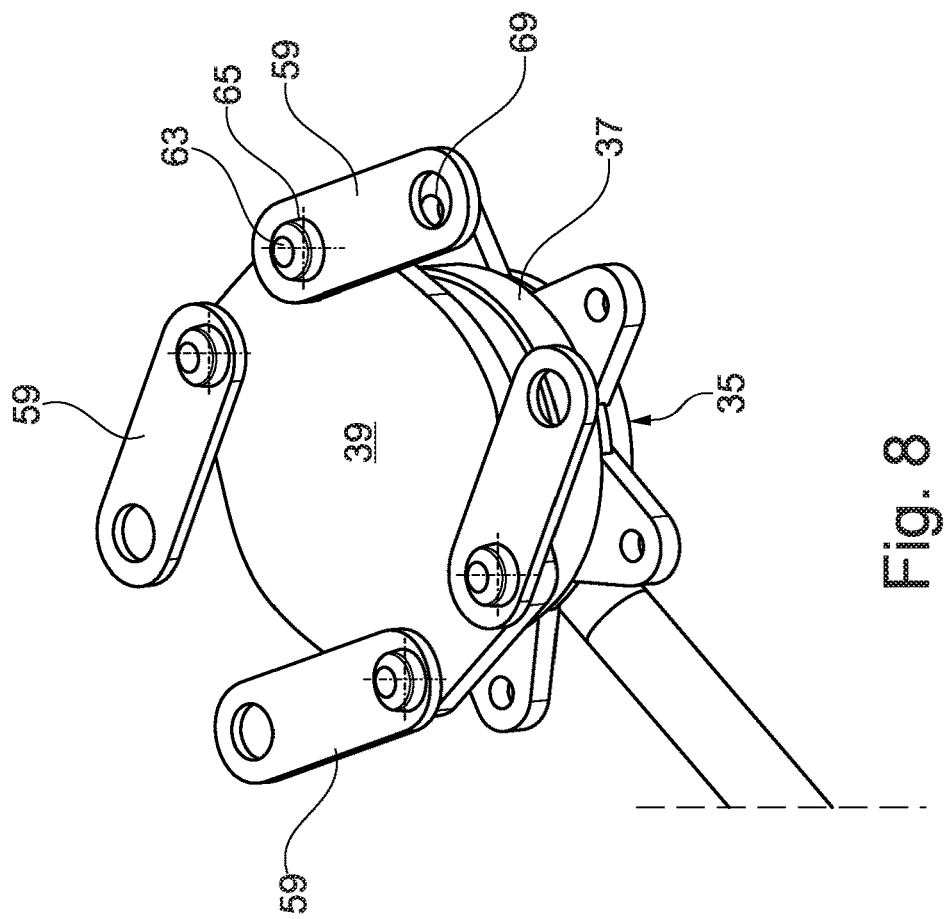
FIG. 8 is a partial perspective view of the coupling arrangement of FIG. 7.

FIG. 1 shows a schematic top view of an aircraft being provided with two wing arrangements according to a first embodiment of the present invention. The aircraft comprises a fuselage 1 extending along a longitudinal axis 3 which corresponds to the x-axis of the aircraft (the y-axis extends perpendicular to the x-axis in a horizontal plane when the aircraft is on the ground, whereas the z-axis extends vertically perpendicular to the x and y-axes). The wings 5 extend away from the fuselage 1, and each wing 5 comprises a base section 7 having a first end portion 9 which is coupled to the fuselage 1. As it can also be seen from FIG. 2 showing the wing 5 of FIG. 1 in more detail, the base section 7 extends between the first end portion 9 and a second end portion 11 (as it is also shown in the insert of FIG. 1.

A tip section 13 of the wing 5 is pivotably connected to the second end portion 11 of the base section 7. In particular, the tip section 13 extends away from the distal end or second end portion 11 of the base section 7 and comprises a third end portion 15 and a fourth end portion 17. The third end portion 15 is pivotably mounted on the second end portion 11 of the base section 7 so that the tip section 13 may pivot between a deployed position and a stowed position about a pivot axis 19 (see FIG. 2). The pivot axis 19 extends essentially vertically but is tilted, in this preferred embodiment by 15°, with respect to the z-axis of the aircraft, as it is shown in FIG. 2. The tip section 13 may pivot between a deployed position in which it extends essentially along the longitudinal axis of the base section 7, and a stowed position in which the tip section 13 is angled forwards or backwards with respect to the longitudinal axis of the base section 7 (see FIG. 2 which show both positions).

In particular, as shown in FIG. 2, the spanwise length of the entire wing 5 formed of the base section 7 and the tip section 13 is larger in the deployed position than in the stowed position. In other words, in the deployed position the length of the entire wing 5 measured parallel to the y-axis is larger compared to the stowed position. Further, the pivot axis 19 is tilted such that the fourth end portion 17 of the tip section 13, when the tip section 13 pivots from the deployed position to the stowed position, moves upwards, as shown in FIG. 2.

As can be seen in FIGS. 3 and 4, the first embodiment of a wing arrangement according to the present invention comprises a coupling arrangement formed of an annular outer part in the form of an outer ring member 21 and an annular inner part in the form of an inner ring member 23. The outer ring member 21 is fixedly coupled to the second end portion 11 of the base section 7, whereas the inner ring member 23 is fixedly coupled to the third end portion 15 of the tip section 13. Both the outer and the inner ring members 21, 23 are circular but it is conceivable that they have the shape of a segment of a circle.

As can be further seen, the inner ring member 23 is formed of an upper element 25 and a lower element 27 which are connected. Further, the inner ring member 23 comprises an outer support surface facing radially outwardly and being provided with an annular recess 29, the depth direction of which extends in the radial direction of the inner ring member 23. The outer ring member 21 comprises an inner support surface facing radially inwardly and being provided with an annular protrusion 31 which extends into the annular recess 29 so that the outer support surface in the form of the annular recess 29 abuts on the inner support surface in the form of the annular protrusion 31.

Hence, in this embodiment both ring members 21, 23 extend in a common plane so that the dimensions of the coupling arrangement in the direction of the z-axis are rather small. The outer ring member 21 surrounds a receiving space in which the inner ring member 23 is positioned, and in turn the inner ring member 23 surrounds an actuator space 33 in which an actuator 35 is received, as will be discussed below in more detail.

Due to the circular shape of the annular recess 29 and the annular protrusion 31 the inner ring member 23 is guided along the annular protrusion 31 so that the tip section 7 fixedly coupled to the inner ring member 23 may pivot between the deployed and the stowed positions with respect to pivot axis 19 defined by the center of the inner and outer ring members 21, 23, and the pivot axis 19 is perpendicular to the plane in which the ring members 21, 23 extend.

The actuator 35 of the coupling arrangement received in the actuator space 33 comprises a base member 37 and an output member 39 which are pivotably mounted on each other. The base member 37 and the output member 39 are dimensioned such, especially perpendicularly to the pivot axis 19, that both the base member 37 and the output member 39 can be moved at least partially into the actuator space 33 from one axial end of the receiving space 33 by a simple linear movement along the pivot axis 19 which facilitates the assembly of the actuator 35 in the coupling arrangement.

Further, the base member 37 comprises a fixing flange 41 which extends radially outwardly from the base member 37 and in the assembled state abuts on an abutment surface formed on an abutment element 43 fixedly mounted on the second end portion 11, wherein the abutment surface extends perpendicular to the pivot axis 19. Further, the fixing flange 41 is secured to the abutment element 43 so as to prevent a relative movement. In this preferred embodiment, the abutment element 43 is formed as a separate element mounted on the second end portion 11 of the base section. However, it is also conceivable that the abutment element is formed integrally or in one piece with the second end portion 11 or is part of the outer ring member 21.

Moreover, the coupling arrangement of the first embodiment comprises a disc shaped coupling member 45 which extends perpendicular to the pivot axis 19 across the actuator space 33, so that in combination with the third end portion 15 it delimits the actuator space 33 at one axial end thereof. The coupling member 45 is secured to the third end portion 15 by bolts (not shown) and comprises a first engagement member which is formed as a sleeve 47 having an internal straight spline (see also Part a) of FIG. 6). Hence, due to the rigid connection between the coupling member 45 and the third end portion 15, the sleeve 47 is also fixedly coupled to the third end portion 15. Further, as the third end portion 15 is provided with a hole between the sleeve 47 and the actuator space 33, the sleeve 47 is accessible from the actuator space 33. Here, it has to be noted, that the internal spline in the sleeve 47 may also be formed as a curved spline.

The output member 39 of the actuator 35 comprises a pin 49 which extends along the pivot axis 19 and in this preferred embodiment is provided with a curved outer spline 51 such as crowned curved spline. Thus, when the pin 49 is brought into meshing engagement with the sleeve 47 by inserting the pin 49 in the sleeve 47 when inserting the entire actuator 35 in the actuator space 33 by a linear movement along the pivot axis 19, the sleeve 47 and the pin 49 are rotationally coupled. This in turn means that the output member 39 and the third end portion 15 are fixedly coupled so as to transmit torque. The curved spline 51 on the pin 49 is configured such that the radial part of the outer cross section of the outer spline 51 taken along the longitudinal axis of the pin 49 is curved. When a crowned spline is employed on the pine 49, the root line of the spline is a radius. Further, it is also conceivable that the curved spline is a double tapered spline so that the root line of the spline is a shallow inverted "V".

Such a splined connection has the advantage that a mismatch or misalignment of the pivot axis 19 as defined by the ring members 21, 23 and the rotational axis of the actuator 35 can be compensated as the axes can both be tilted and offset to a limited extent. In particular, when the actuator axis is tilted with respect to the pivot axis 19 or the actuator 35 is axially or radially offset from its intended position, this is compensated by the splined connection employed here.

Finally, the actuator comprises drive means (not shown) which are coupled to the base member 37 and the output member 39 and which, when being actuated, effect a pivotal movement of the output member 39 and hence the tip section 11 relative to the base member 37 about the pivot axis 19.

Thus, in the first embodiment the actuator 35 is coupled to the second and third end portions 11, 15 in such a manner, that the load path to the bearing arrangement formed by the outer and inner ring members 21, 23 is extremely short which results in weight savings. As the actuator 35 with the splined connection between the output member 39 and the coupling member 45 and the third end portion 15, respectively, can easily be installed, maintenance of the coupling arrangement is also facilitated.

FIG. 5 and Part b) of FIG. 6 show a second embodiment of a wing arrangement which differs from the first embodiment described before only in that the pin 49' on the actuator 35 is not rigidly connected with the output member 39.

Instead, the pin 49' comprises a first outer curved spline 53 and a second outer curved spline 55 which are spaced along the pivot axis 19. The first outer curved spline 53 meshingly engages with the internal spline in the sleeve 47 of the coupling member 45. In addition, the output member 39 of the actuator 35 of this embodiment comprises a receiving opening 57 the internal wall of which is provided with a second internal spline. In particular, the internal spline can be formed in a sleeve (not shown in detail) which in turn is secured in the receiving opening 57 of the output member 39. The second curved outer spline 55 of the pin 49' meshingly engages with the second internal spline.

Also in this embodiment when the actuator axis is tilted with respect to the pivot axis 19 or the actuator 35 is axially or radially offset from its intended position, this is compensated by the splined connection. In particular, as two splined connections are employed, this embodiment is capable of accepting a larger mismatch between the output member 39 of the actuator 35 and the bearing arrangement due to tolerances.

FIGS. 7 to 10 show a third embodiment of a wing arrangement according to the present invention. This embodiment differs from the first and second embodiments only in that the connection between the output member 39 of the actuator 35 and the third end portion 15 does not employ a splined connection between a sleeve 47 and a pin 49.

Figure 10:
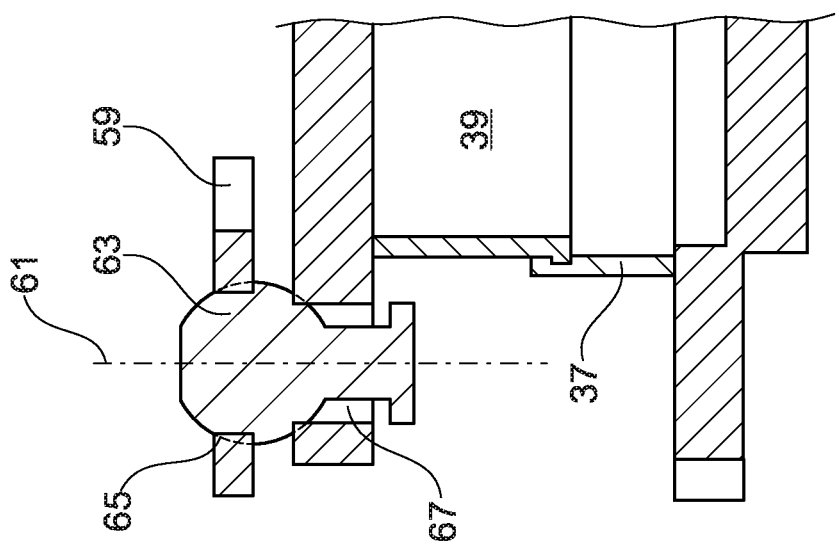
FIG. 10 shows a detail of FIG. 9.

In this embodiment, four arm members 59 are pivotably coupled to the output member 39 of the actuator 35 so that each arm member 59 may pivot relative to the output member 39 about an axis 61 which is parallel to the pivot axis 19 (see FIG. 10). In particular, each arm member 59 is pivotably coupled to the output member 39 by a ball member 63 which extends into a first hole 65 formed in the arm member 59 and into a second hole 67 formed in the output member 39.

In addition, as it can be derived from FIG. 7 that each arm member 59 is also pivotably coupled to the third end portion 15 so that the arm members 59 may pivot with respect to the third end portion 15 about an axis which is parallel to the axis 61 about which the arm member 59 pivots with respect to the output member 39. In particular, each arm member 59 is directly mounted on the inner ring member 23 by a ball member connection similar to the connection between the arm member 59 and the output member 39, the respective ball members being inserted in further holes 69 in the arm members 59.

Since the holes 65, 69 are spaced on the arm members 59, for each arm member 59 the pivotable coupling of the arm member 59 to the output member 39 is spaced from the pivotable coupling to the third end portion 15 when seen in a plane perpendicular to the pivot axis 19.

The coupling assembly between the output member 39 and the inner ring member 23 of the third embodiment employing the arm members 59 can also compensate a mismatch or misalignment of the pivot axis 19 as defined by the ring members 21, 23 and the rotational axis of the actuator 35. In particular, also an axial and/or radial offset of the actuator 35 relative to its intended position will compensated.

Figure 11:
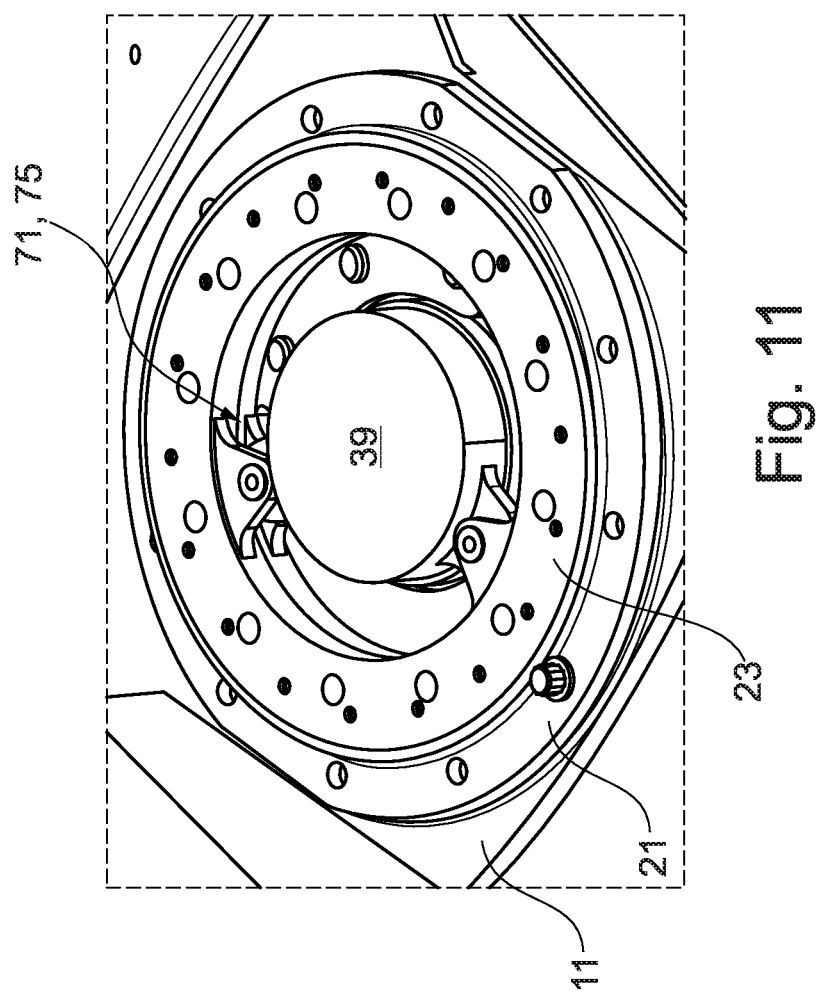
FIG. 11 is a partial perspective view of the coupling arrangement of a fourth embodiment of a wing arrangement of the present invention.

The fourth embodiment of a wing arrangement shown in FIGS. 11 to 13 differs from the first, second and third embodiment only in the configuration of the connection between the output member 39 of the actuator 35 and the third end portion 15.

In the fourth embodiment, the annular outer part in the form of the outer ring member 21 is secured to the second end portion 11 of the base section 7, whereas the annular inner part, i.e. the inner ring member 23, is connected to the third end portion 15 of the tip section 13. Further, the output member 39 of the actuator 35 comprises outwardly extending lug members 71 each of which extend into a corresponding slot 73 formed in a link member 75 fixed to and extending radially inwards from the inner ring member 23. The link members 75 are provided with elongated holes 77 which are aligned with holes 79 formed in the lug members 71. In the holes 79 of the lug members 71 ball members 81 are supported by a ring element 83 the inner diameter of which corresponds to the outer diameter of the ball member 81. Hence, the effective inner diameter of the holes 79 in the lug members 71 corresponds to the outer diameter of the ball members 81.

Finally, each lug member 71 is pivotably coupled to a link member 75 by a bolt 85 extending through the elongated holes 77 in the link member 75 and a through hole in the ball member 81.

Firstly, the lug members 71 and the link members 75 may pivot about an axis which is parallel to the pivot axis 19. Further, the arrangement of the bolt 85 extending through the ball member 83 in combination with the elongated holes 77 allows for the actuator 35 being tilted with respect to the pivot axis 19 without obstructing functioning of the actuator 35. Hence, this configuration also accepts a mismatch or misalignment due to tolerances between the actuator and the bearing arrangement.

A wing arrangement for an aircraft is described including a wing (5) having a base section (5) and a tip section (13), the base section (7) having a first end portion (9) and a second end portion (11), the tip section (13) having a third end portion (15) and a fourth end portion (17), wherein the second end portion (11) and the third end portion (15) are coupled with each other by a coupling arrangement so that the tip section (13) is pivotable with respect to the base section (7) about a pivot axis (19, 19'). One of an annular outer part (21) and an annular inner part (23) is fixedly coupled to the second end portion (11) and the other of the annular outer part (21) and the annular inner part (23) is fixedly coupled to the third end portion (15), wherein the annular outer part (21) surrounds a receiving space, the annular inner part (23) being at least partially received in the receiving space, wherein the annular inner part (23) at least partially surrounds an actuator space (33), wherein the annular outer part (21) and the annular inner part (23) are configured such that the annular inner part (23) is guided by the annular outer part (21) inside the receiving space for the pivot movement about the pivot axis (19) between the deployed and stowed positions, wherein the coupling arrangement further comprises an actuator (35) received in the actuator space (33) and having an member (37) and an output member (39) which is pivotably mounted on the output member (37).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing arrangement for an aircraft comprising:
   a wing having a base section and a tip section, the base section having a first end portion and a second end portion, the tip section having a third end portion and a fourth end portion,
   wherein the first end portion is adapted to be coupled to the fuselage of the aircraft,
   wherein the second end portion and the third end portion are coupled with each other by a coupling arrangement such that the tip section is pivotable with respect to the base section about a pivot axis between a stowed position and a deployed position, the spanwise length of the wing between the first end portion and the fourth end portion being larger in the deployed position than in the stowed position, wherein the coupling arrangement comprises an annular outer part and an annular inner part, wherein one of the annular outer part and the annular inner part is fixedly coupled to the second end portion and the other of the annular outer part and the annular inner part is fixedly coupled to the third end portion, wherein the annular outer part extends in a plane perpendicular to the pivot axis and at least partially surrounds a receiving space, the annular inner part being at least partially received in the receiving space, wherein the annular inner part at least partially surrounds an actuator space, wherein the annular outer part and the annular inner part are configured such that the annular inner part is guided by the annular outer part inside the receiving space for the pivot movement about the pivot axis between the deployed and stowed positions, wherein the coupling arrangement further comprises an actuator received in the actuator space and having a base member and an output member which is pivotably mounted on the base member, wherein the base member is fixedly coupled to the second end portion and the output member is fixedly coupled to the third end portion so that the output member may pivot with respect to the base member about the pivot axis, wherein the actuator comprises drive means coupled to the base member and the output member and being adapted such that when the drive means are actuated a pivotal movement of the output member relative to the base member about the pivot axis is effected.

2. The wing arrangement according to claim 1, wherein the annular outer part is fixedly coupled to the second end portion and the annular inner part is fixedly coupled the third end portion.

3. The wing arrangement according to claim 1 wherein the annular outer part is formed as an outer ring member being circular or having the shape of a segment of a circle and having an inner support surface, wherein the annular inner part is formed as an inner ring member being circular or having the shape of a segment of a circle and having an outer support surface and wherein the inner support surface at least partially abuts on the outer support surface.

4. The wing arrangement according to claim 3, wherein one of the inner support surface and the outer support surface comprises at least one protrusion extending radially with respect to the pivot axis and wherein the other of the inner support surface and the outer support surface comprises an annular recess extending radially with respect to the pivot axis, wherein the at least one protrusion and the recess are configured such that the protrusion extends into the recess.

5. The wing arrangement according to claim 1, wherein a coupling member is provided which extends over the actuator space, wherein the coupling member is fixedly coupled to the third end portion and comprises a first engagement member being accessible from the actuator space, wherein the output member comprises a second engagement member, being in engagement with the first engagement member, wherein the first and the second engagement members are configured such that when being in engagement with each other torque supplied by the output member is transferred to the coupling member and that the second engagement member can be disengaged from the first engagement member by a linear movement of the actuator along the pivot axis.

6. The wing arrangement according to claim 5, wherein the base member and the output member are dimensioned such that the base member and the output member can be moved at least partially into the actuator space by a linear movement along the pivot axis, wherein the base member comprises at least one fixing element fixedly coupled to the base member and extending radially outwardly therefrom, wherein when the first and second engagement members are in engagement with each other, the at least one fixing element abuts on an abutment surface formed on an abutment element fixedly coupled with the second end portion, the abutment surface extending transversely to the pivot axis.

7. The wing arrangement according to claim 5, wherein the first engagement member is one of a sleeve having an internal spline and a pin having an outer spline, wherein the second engagement member is the other of a sleeve having an internal spline and a pin having an outer spline and wherein the pin extends into the sleeve so that the internal spline meshingly engages with outer spline.

8. The wing arrangement according to claim 7, wherein the outer spline is formed as a curved spline such that the radial part of the outer cross section of the curved spline taken along the longitudinal axis of the pin is curved.

9. The wing arrangement according to claim 5, wherein the first engagement member is formed as a sleeve having a first internal spline and the second engagement member is formed as a pin having a first outer curved spline such that the radial part of the outer cross section of the first outer curved spline taken along the longitudinal axis of the pin is curved, wherein the first outer curved spline meshingly engages with the first internal spline, wherein the output member comprises a receiving opening the internal wall of which being provided with a second internal spline, wherein the pin comprises a second outer curved spline which meshingly engages with the second internal spline, and wherein the radial part of the outer cross section of the second outer curved spline taken along the longitudinal axis of the pin is curved.

10. The wing arrangement according to claim 1, wherein at least two arm members are pivotably coupled to the output member so that each arm member may pivot relative to the output member about an axis which is parallel to the pivot axis, wherein each arm member is pivotably coupled to the third end portion so that each arm member may pivot relative to the third end portion about an axis which is parallel to the pivot axis, and wherein for each arm member the pivotable coupling to the output member is spaced from the pivotable coupling to the third end portion when seen in a plane perpendicular to the pivot axis.

11. The wing arrangement according to claim 10, wherein each arm member is pivotably coupled to the output member by a ball member which extends into a first hole formed in the arm member and into a second hole formed in the output member.

12. The wing arrangement according to claim 10, wherein the annular outer part is fixedly coupled to the second end portion and the annular inner part is fixedly coupled to the third end portion and
wherein each arm member is directly pivotably coupled to the annular inner part.

13. The wing arrangement according to claim 1, wherein the annular outer part is fixedly coupled to the second end portion and the annular inner part is fixedly coupled to the third end portion,
wherein the output member comprises lug members extending radially outwards from the output member,
wherein the annular inner part comprises link members extending radially inwards and
wherein each of the lug members is pivotably coupled with one of the link members such that the lug member may pivot with respect to the link member about an axis that is parallel to the pivot axis.

14. The wing arrangement according to claim 13, wherein one of the lug members and the link members are formed such that each of the members comprises a radially extending slot open towards the other of the lug members and the link members so that each of the other of the lug members and the link members extend into a slot,
wherein each of the lug members is coupled to one link member by a bolt extending through the aligned holes in the lug member and the link member,
wherein a ball member is arranged in the hole of each of the other of the lug members and the link members, the ball member having an outer diameter corresponding to the diameter of the hole in which it is arranged and
wherein the each bolt extends through a through hole in the ball member.

15. An aircraft comprising a fuselage and at least one wing arrangement according to claim 1.

* * * * *